Feb. 18, 1947.  T. OBSZARNY  2,416,018
ELECTRIC MOTOR FOLLOW-UP SYSTEM
Filed March 22, 1943  4 Sheets-Sheet 1

INVENTOR.
Theodore Obszarny,
BY
Bair & Freeman
Atty's.

Patented Feb. 18, 1947

2,416,018

UNITED STATES PATENT OFFICE 2,416,018

ELECTRIC MOTOR FOLLOW-UP SYSTEM

Thedore Obszarny, Chicago, Ill., assignor to Guardian Electric Manufacturing Co., Chicago, Ill., a corporation of Illinois Application March 22, 1943, Serial No. 480,045

9 Claims. (Cl. 172—239)

The present invention relates to control devices of the type, which, for convenience, may be termed preselector devices, for electrically controlling operation, either in terms of time, or amount of movement, of various remotely located apparatus.

More particularly, this invention is directed to a preselector of the type adapted to be used in conjunction with and adapted for controlling operation of a remotely located apparatus, including an electric motor which is operably connected and serving to mechanically actuate or move various types of apparatus, devices, machines, etc., within a selected or predetermined range of movement. The path of movement of such apparatus, may be linear movement, in a vertical, horizontal or inclined directions, rotary movement, or any other movement in a predetermined path of travel.

The preselector embodying the present invention functions to provide relatively accurate adjustment of apparatus to a predetermined position, within a selected range of movement of the apparatus, such as for example, the angular position of adjustment of the trim tabs of an airplane, or the adjustment or pointing of machines, guns and various other apparatus. The preselector and the apparatus to be controlled, may be located remotely from each other, and the preselector is caused to function in a step-by-step manner to cause adjustment of said remotely located apparatus to an exact predetermined and preselected position of adjustment.

One of the objects of the present invention is to provide a novel control device of the character indicated, constructed and arranged to permit preselection of both direction and extent of movement of remotely located apparatus operated by an electric motor, and causing said apparatus to move to said selected position of adjustment, within its permissible range of movement.

Another object is to provide an improved control of the character indicated for adjusting remotely located apparatus to a predetermined position, within a predetermined range of movement, and wherein the control comprises a rotatable member adapted to be preadjusted, to either side of a zero starting position, a predetermined amount, corresponding to the amount of movement that the apparatus is to be moved, in either a forward or backward direction, and which movement is effected immediately after said control has been so adjusted.

A further object is to provide an improved control device of the character described which is constructed to visually indicate, at all times, the exact position of adjustment of the remotely located apparatus, under control of said control device.

Still another object is to provide an improved control device of the character indicated, provided with interlocking features for simultaneously actuating the control in synchronized relation to an electric motor, and to the apparatus being actuated thereby, together with the provision of means for indicating at any given time the exact position of adjustment of said remotely located apparatus.

A further object is to provide an improved control of the character indicated, provided with an axially shiftable, rotatably adjustable member for preselecting the position to which the remotely located apparatus is to be moved within its permissible range of movement, together with safety features, which preclude operation of the control and motor until said member is returned to its initial position of axial adjustment.

A still further object resides in the provision of a preselector of the character indicated, provided with a novel device for insuring maintenance of the control and the remotely located motor and apparatus actuated thereby in a synchronized relation to each other at all times.

And still a further object is to provide a novel control of the character indicated which is of simple construction, durable and efficient in use, and capable of embodiment in a relatively lightweight, compact unitary form.

Other objects and advantages of this invention will be apparent from the following description, taken in connection with the accompanying drawings, in which:

Figure 3ᵃ is a view similar to Figure 3, but showing the control device in a position to which it has been adjusted, and operated.

The preselector device constituting the present invention is in the nature of a compact, unitary device adapted to be mounted in any convenient manner, such as through an aperture, as indicated at 10, in a mounting panel, designated at 11.

The entire control device is connected to and totally supported by a frame member 14, which includes a horizontal, forwardly extending, annular flange 15, and a transverse flange 16 adapted to seat against the face of the panel 11, and secured in position thereon by means of bolts indicated at 17. The flanges 15 and 16 of the frame in effect constitute an escutcheon plate or bezel ring for dial apparatus hereinafter referred to.

The frame member includes a transverse panel 18, in the center of which is press-fitted an annular plug 19 constituting a bearing to provide journal support for a hub member 20, which in turn provides journal support for an axially located, longitudinally extending tubular shaft 21, the opposite end of which shaft is journaled in a shouldered bearing member 23, press-fitted in a mounting plate 24 which forms a part of the main frame structure.

Rigidly connected to the main frame member 14 and forming a part of the framing structure, in addition to plate 24, is an outer end mounting plate 25, an intermediate mounting plate 26, and a guide plate 27 at the forward end of the assembly. The two frame plates 24 and 26 are of segmental, circular contour, whereas the frame plates 25 and 27 are of circular contour. These four plates are rigidly secured together and to the frame member 14 by inter-connecting stud members as indicated generally at 28, each comprising parts 28a, 28b, 28c, 28d and 28e; there being three sets of stud connections 28, for securing the frame structure together, as a unit, as may be seen in Figure 9 of the drawings.

The tubular shaft 21 is held in position in the frame plates 24, 25, 26, and 27, against axial movement, by means of a collar 31, secured in place by a set screw 32 in abutting relation to the front side of the frame plate 24 and cooperating with the shouldered bearing 23. Secured on the outer or rear end of the tubular shaft is a shouldered collar member 34, secured in position thereon by a set screw 35, said collar being disposed in substantially abutting relation to the outer end of the bearing 23. By this arrangement, the tubular shaft is substantially confined against axial movement within the frame structure.

Figures 3, 4, 5, 6, 7:
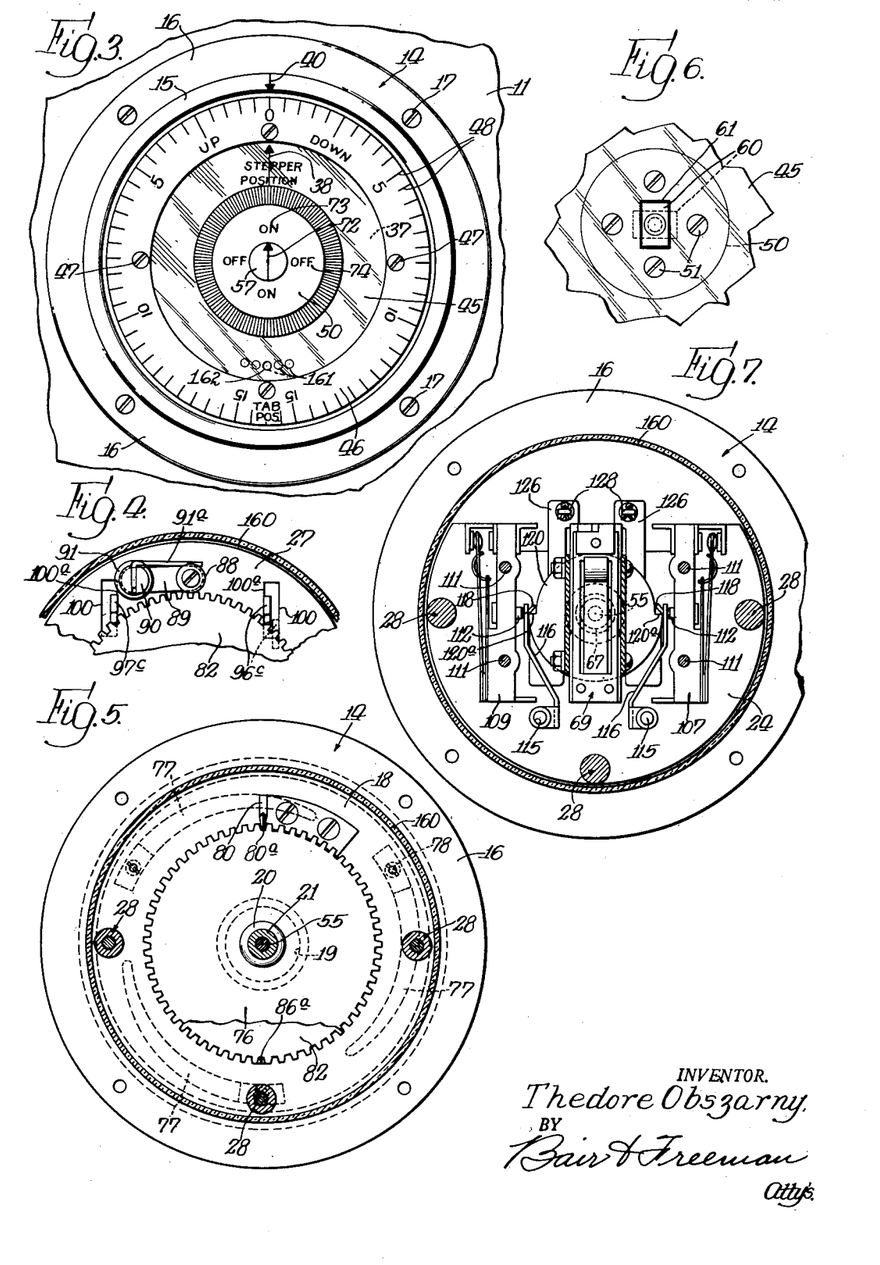
Figure 3 is a front, elevational view of the front end of the preselector device.
Figure 4 is a fragmentary, sectional view taken as indicated at line 4—4 of Figure 2, showing a portion of the stepper apparatus and the detent for maintaining the stepper gear under slight pressure in adjusted positions.
Figure 5 is a transverse, staggered selectional view, with the mounting panel omitted, taken as indicated at line 5—5 on Figure 1, showing the selector gear and a portion of the stepper gear.
Figure 6 is a fragmentary, elevational view taken as indicated at line 6—6 on Figure 1, showing the latching feature associated with the main switch operating knob.
Figure 7 is a transverse, sectional view, with the mounting panel omitted, taken as indicated at line 7—7 on Figure 2.

Rigidly mounted on the extreme forward end of the tubular shaft 21, transversely of the axis, is a selector disc 37, the face of which for convenience is provided with a radial extending indicating arrow 38, as seen in Figures 3 and 3ᵃ of the drawings. The purpose of the indicating arrow is to visually indicate the position of adjustment of the stepper mechanism at any time, as well as the position of the apparatus being adjusted. This indicator is normally disposed in a position, in registration with a corresponding, radially aligned indicating arrow 40, formed on the forward face of the flange 15 of the frame member 14, as seen in Figure 3 of the drawings.

After the control has been adjusted to a preselected position for effecting a corresponding proportional amount of movement of the remotely located apparatus, the indicating arrow 38 is then by a stepping action, to be hereinafter described, returned to the zero starting position in registration with the indicating arrow 40, as seen in Figure 3 of the drawings.

Rigidly secured to the forward end portion of the hub 20 and rotatably movable therewith, is a dial frame 43 of flattened cup-shaped formation, surrounding the position disc 37, and mounted in overlapping relation to the cavity thereof, in front of the disc 37, is a transparent panel 45, preferably of plastic material, which is held in place on the member 43 by means of a dial ring 46 which is connected by screws 47 to the forward flange of said member 43. The dial ring as shown in the drawings is graduated as indicated at 48, and is provided with a zero indication, which initially is disposed in registration with the index arrow 40 on the main frame member 14, and the dial ring is graduated in opposite directions from the zero indication, and has thereon on one side the word "Up" and on the opposite side the word "Down," so as to clearly indicate visually the position and the direction of adjustment of the remotely located apparatus, to be controlled. The particular form of graduated dial ring shown is suitable for use with apparatus to be controlled which is adapted to have an up-and-down movement in a predetermined range, or the movement may be straight-line movement, rotative movement, or other suitable movement. The graduations on the dial ring 46 may be formed to suit the particular conditions of use, and may be graduated as shown, to represent degrees, or may indicate various other desirable forms of measurement.

It is to be understood, and as will hereinafter appear, the dial and associated parts are adapted to be rotated in either direction through an arc of approximately 180°, at which position it is arrested. Suitable stop means may be provided for arresting rotation of the dial in opposite directions in any lesser amount, if desired. It is to be clearly understood that the graduations on the dial ring 46, are proportional and correspond to the range of movement of the apparatus to be controlled, and while the dial ring may be graduated in degrees, such graduations need not necessarily correspond to angular measurement of positions of rotative movement of the dial ring 46 and associated parts.

Rigidly secured centrally of and extending forwardly from the transparent panel 45 is a main adjusting knob 50, which is secured in position with respect to the panel by screws 51. The forward face or outer end of the knob is provided with indicia for use in connection with indicating the position of adjustment of a main control switch to be actuated by an axially extending shaft 55 slidably mounted within the tubular shaft 21. The forward end of the shaft 55 terminates in close proximity to a plane at the inner face of the transparent panel 45. Cooperating with the shaft 55 is a central knob 57 slidably mounted within and disposed centrally of the adjusting knob 50, within a cylindrical opening 58, provided in said knob 50. A suitable portion of the knob 57 extends forwardly beyond the face of the adjusting knob 50, and its inner end terminates in a reduced shank 59, and has rigidly connected to its inner end, a latching bar 60 of generally rectangular or oblong form, which is adapted in one position of adjustment of the knob 57 to fit into a correspondingly formed aperture 61 in the transparent panel 45, so as to be disposed substantially flush with the inner face of said panel as seen in Figure 1 of the drawings.

Figure 1:
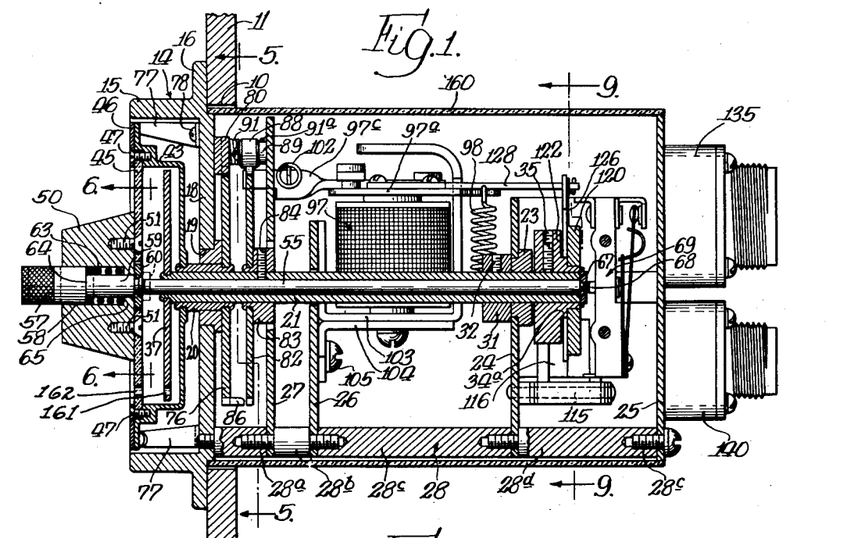
Figure 1 is a vertical, axial section through my novel preselector device.

A coil spring 63 surrounds the reduced portion 59 of the inner knob and reacts against an annular shoulder 64 on said inner knob and against a shoulder 65 in the cavity of the adjusting knob 50, so that said spring normally tends to urge the central knob 57 to the position seen in Figure 1 of the drawings.

The opposite end of the central shaft 55 is provided with an abutment head 67, adapted to engage a spring-pressed plunger 68, of a conventional snap-action switch indicated generally at 69, which switch, it may be understood, constitutes a main control switch of the electrical circuit for controlling the remotely located apparatus including a remotely located electric motor and other apparatus to be adjusted under control of the preselector.

It is to be understood that the switch 69, which as seen in Figure 1 of the drawings is in open position, is normally disposed in a closed position, and for accomplishing this, the inner knob 57 is depressed so that the latching bar 60 is disengaged from the opening 61 in the panel 45, as indicated in dotted outline in Figure 1 of the drawings, and the knob 57 may then be rotated so as to dispose the latching bar transversely of the rectangular opening 61, and thereby lock the inner knob against outward movement by the spring 63.

When the knob is pushed inwardly, it engages and imparts movement to the shaft 55 and by virtue of which the opposite end of said shaft, carrying the abutment head 67, operates the plunger 68, causing the snap-action switch 69 to assume an open circuit position. In the pushed-in position of the knob 57, it acts as a safety feature, which as will hereinafter appear, precludes rotative adjustment of the adjusting knob 50.

For convenience in indicating whether or not the main operating switch is in open or closed position, the outer end of the knob 57 is provided with an indicating arrow 72, in central alignment with the locking bar 60, and which is adapted when the parts are in the position seen in Figure 1 of the drawings to register with the indicia comprising the word "On" as indicated at 73, appearing at two diametrically opposite points on the face end of the adjusting knob 50. This face of the adjusting knob 50 is also provided with indicia indicated at 74, comprising the word "Off" located at diametrical points at right angles to the words "On," and registration of the arrow 72 with either of indicia 74, indicates that the knob 57 has been pushed inwardly and locked in position, in which position the main switch 69 is in open circuit adjustment.

Thus when the knob 57 is in the position as seen in Figures 1 and 3 of the drawings, in its outermost position, the main switch 69 is closed, and the arrow 72 on the knob 57 is disposed in registration with either of the words "On," indicating that the main control circuit is closed, and the preselector is ready for operation. The preselector may then be operated by first moving the main knob 50 axially, as will hereinafter be described, after which rotation of an assembly of parts associated with the knob 50 may be made to a predetermined angular position, to either side of the neutral or zero starting position.

To render the preselector inoperative, the knob 57 is depressed axially to disengage the latching bar 60 from its cooperating notch or aperture 61 in the panel 45, as indicated in dotted line position in Figure 1 of the drawings, and the knob 57 may then be rotated approximately 90° to dispose the bar 60, crosswise of the cooperating opening 61, to lock the knob 57 in its inner position and thereby cause the shaft 55 to hold the main switch 69 in open circuit position. In this condition of adjustment of the parts, the indicating arrow 72 is then disposed substantially in alignment with either of the words "Off" on the face of the main adjusting knob 50.

Rigidly secured to the inner end of the hub or journal member 20 is a selector gear 76, which gear is adapted to be rotated with the dial frame 43, and the dial ring 46, together with the transparent panel 45 and adjusting knob 50 as a unit. This assembly of parts is normally urged outwardly to the position seen in Figure 1 of the drawings by three circumferentially spaced-apart arcuate spring fingers 77 secured by screws 78 to the outer face of the web 18 of the frame member 14. The outer or free ends of said springs react against the inner face of the flange of the dial frame 43, and the assembly is limited in outward movement to the position seen in Figure 1 of the drawings, by the selector gear 76 abutting against the end of the bearing 19. In such a position of the parts, the selector gear is disposed in inter-meshing relation with an indexing or stop lug 80 secured to the inner face of the web 18 of the frame member 14. The lug includes a wedge-shaped projection 80a of such shape and location as to permit and insure locking engagement in and registration with a space between two adjacent teeth on the selector gear, irrespective of the position of adjustment of the gear in relation to said lug when pressure on the knob 50 is released, and the assembly is moved outwardly by the springs 77 to the position seen in Figure 1 of the drawings. In such a position the assembly of parts associated with the knob 50 is releasably locked in fixed relation to the frame member 14, by engagement of the gear 76 with lug 80.

Rigidly secured on the tubular shaft 21, rearwardly with respect to the selector gear 76, and in close spaced-apart relation thereto, is a stepper gear 82, which is rigidly mounted on a hub member 83, which in turn is fixedly secured by means of a set screw 84 to the tubular shaft 21. It may be understood that the selector gear 76 and the stepper gear 82 desirably are of the same diameter and have the same number of teeth and pitch of teeth.

Secured to the outer periphery of the selector gear 76, and extending toward the stepper gear 82, is an interlocking, driving dog 86, disposed in registration with a space intermediate a pair of adjacent teeth of said stepper gear and having its forward end terminating in a wedge as indicated at 86a, adapted when the assembly of parts above described, including the selector gear 76, is shifted axially inward, to intermesh with an aligned space between two adjacent teeth on the stepper gear 82. In such adjustment the gears 76 and 82 are inter-locked to move as a single unit, when the assembly including the dial frame 43, the dial 46, the transparent panel 45, and the knob 50 are rotated an angular amount about the axis of the assembly.

In order to maintain the stepper gear 82 at any position to which it may be adjusted manually or mechanically, as hereinafter described, I provide a detent, comprising a roller 88 pivotally mounted on the outer end of a lever arm 89, which in turn has its opposite end journaled on a pivot pin 90, on the guide plate 27. A suitable spring, and as herein shown, a coil spring 91, is mounted on the pivot pin 90, and has a free leg 91a, acting on the lever arm 89 to urge the roller 88 in yielding pressure engagement with the toothed periphery of the stepper gear 82, as seen in the drawings.

The stepper gear is adapted to be initially moved with the dial and knob assembly, in a rotary direction to a desired angular position, and is adapted, when disengaged from said assembly, to be returned to a neutral or zero starting position by stepping mechanism comprising a pair of electromagnets 96 and 97, having armatures 96a and 97a respectively hingedly mounted at their rear ends and normally urged to an outward or upward position, as seen in Figure 1 of the drawings, by means of coil springs 98. Pivotally mounted at 96b and 97b on the respective armatures are longitudinally extending actuating arms or stepping fingers 96c and 97c respectively. The forward portions of these stepping fingers project through apertures 100 formed in the guide plate 27 and are normally disposed in a position as seen in Figure 4 of the drawings, adapted, when the respective electromagnets are energized, to engage opposite peripheral portions of the toothed stepper gear 82, so that when one of the electromagnets is operated by pulsating current, the stepper gear 82 is rotated in one direction in step-by-step fashion, and when the other electromagnet is operated by pulsating current, the stepper gear 82 is rotated in an opposite direction in a step-by-step fashion.

The electrical circuits controlled by the preselector device are arranged so that the electromagnets 96 or 97 may be selectively energized, and when so energized, which occurs in an intermittent manner, by pulsations of electrical current, the stepper gear is rotated back to a zero or starting position from a position to which it has been adjusted, and simultaneously therewith the control circuits to the remotely located apparatus to be controlled, are completed for a period of time to effect corresponding adjustment of said apparatus within its predetermined range. When the respective electromagnets are energized, the stepper fingers move downwardly into engagement with the teeth of the stepper gear 82, and for each downward movement of the armature of said magnets, the gear is stepped an angular amount equivalent to the spacing of a tooth.

The purpose of providing the pivotal connection for the stepper fingers is to permit lateral movement of said fingers to insure following action with the gear teeth and to maintain proper driving engagement with the teeth of the gear as the gear is rotated, in such step-by-step fashion. To insure proper relationship of the fingers with respect to the stepper gear, the guide surfaces 100a of the respective apertures 100 in the plate 27 are engaged by said fingers, which, in turn, are interconnected by a coil spring 102, as seen in Figures 1 and 2 of the drawings, serving to urge the fingers into engagement with said guide surfaces.

The electromagnets each include field pieces 103, carrying coils 96d and 97d respectively, and said field pieces are rigidly secured to mounting brackets 104, fixedly secured by screws 105, to the rearward face of the intermediate mounting plate 26. As may be seen in the drawings, the electromagnets are supported substantially equi-distantly with respect to the axis of the shafts 21 and 55, and in substantially parallel planes.

Figure 2:
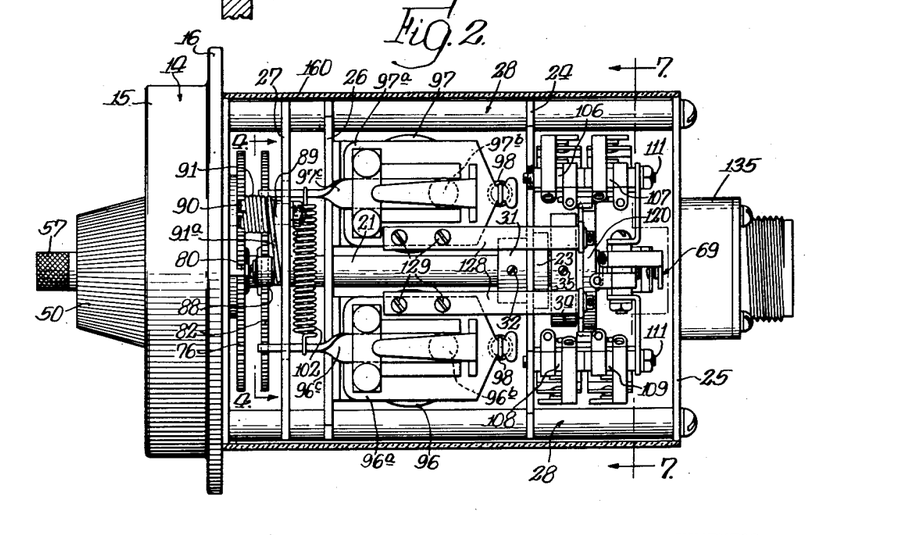
Figure 2 is a top, elevational view of the device with a portion of the cylindrical housing broken away to show the relationship of parts.

Mounted at the outer or rear end of the total assembly, intermediate the mounting plates 24 and 25, are dual sets of snap action switches, located in transversely spaced apart relation to each other, as seen in Figures 2 and 7 of the drawings. These switches are of conventional form and may be identified by reference characters 106 and 107 for one set and by reference characters 108 and 109 for the other set. These sets of switches are rigidly secured to the mounting plate 24 by means of stud bolts 111.

While I have herein shown a certain commercial type of snap action switch, it is to be understood that various other types of switches of an equivalent character may be utilized. Each of these snap action switches include plungers 112 adapted to be engaged by pressure applying elements for shifting the switch mechanism from a closed to an open position.

Mounted on pivot pins 115 connected to the mounting plate 24, adjacent the lower end, as seen in Figures 1 and 7 of the drawings, on opposite sides of said shafts, are dual type switch actuating members 116, each of which include a pair of spaced-apart operating fingers 117, having their upper ends located so as to be disposed in registration with the plunger members 112 of the two adjacent snap switches of a respective set. The upper end of each switch actuator, intermediate the pair of fingers 117, is provided with an inwardly, projecting, cam operating lug 118. It is to be understood that normally the switches 106, 107, 108 and 109 are open and their spring pressure reacts through the plungers 112 and tends to urge the switch actuating members 116 inwardly, toward each other, as seen in Figure 7 of the drawings, and in which position the lugs 118 of the respective actuating members are disposed in the path of travel of a control cam 120, which is fixedly secured on a reduced hub portion, at the outer or rearward end of the collar member 34. The collar member 34 is also reduced in diameter as indicated at 34a, so as to provide an annular groove 122 between the rear face of the collar and the forward face of the cam member 120, as clearly seen in the drawings.

Figure 9:
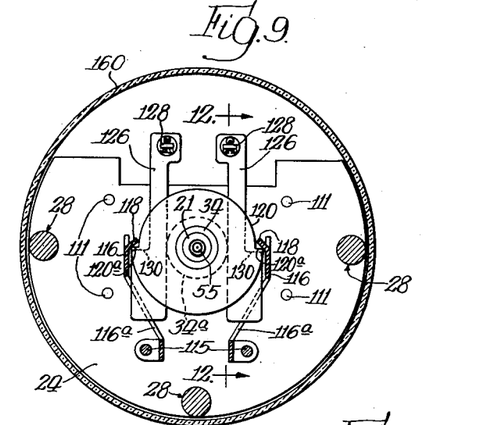
Figure 9 is a transverse sectional view taken as indicated at line 9—9 of Figure 1, and showing my novel mechanical sequence devices in a neutral position, corresponding to a position which the apparatus assumes initially at zero starting position or a position after it has functioned for adjusting the remotely located apparatus to a desired position.
Figure 10:
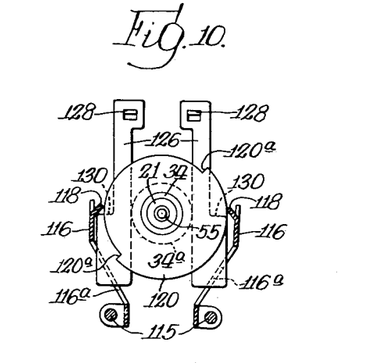
Figure 10 is a fragmentary, sectional view of the mechanical sequence devices, shown in Figure 9, and disposed at a position corresponding to a selected or intermediate position of adjustment of the device, and wherein the stepper mechanism is ready to function, or is in process of operation to return certain parts of the control to a zero starting position and causing adjustment of the remotely located apparatus to a preselected position.
Figure 11:
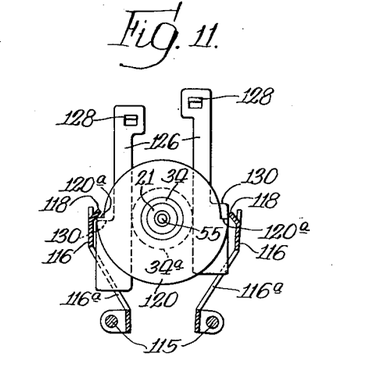
Figure 11 is a view similar to Figure 10, showing the position of parts after the last pulsation of the stepper device has been completed, but just prior to the return movement to the free position of the armature of the actuated electromagnet, which has been operating to cause the stepper device to assume a neutral or zero starting position.
Figure 12:
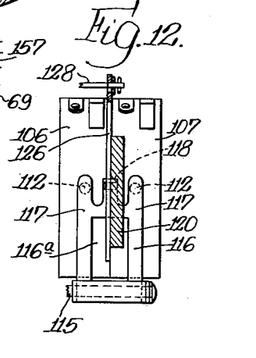
Figure 12 is a detailed, sectional view taken as indicated at line 12—12 on Figure 9, showing one of the members of the mechanical sequence device in relationship to one of the dual switch actuating devices.

As may be seen in Figures 9, 10 and 11, the cam member 120 is of a double formation in which approximately one-half of the periphery thereof is of a uniform diameter and the other half of the periphery is also of a uniform but larger diameter, so as to provide a pair of diametrically opposite shoulders 120a connecting the respective peripheral portions of the cam.

Slidably guided, at opposite sides, in the annular groove 122 formed between the cam 120 and the collar 34 are two trip levers 126, loosely supported at their upper ends on the outer, rearward extensions of a pair of supporting bars 128, rigidly secured by screws 129 to the upper surface of the respective armatures 96a and 97a. The contour of the trip levers 126 may be clearly seen in Figures 10 and 11 of the drawings and each includes a transverse abutment shoulder 130, which, when the entire mechanism is in a zero or neutral position, are disposed in alignment slightly below the shoulders 120a of the cam 120, as clearly seen in Figure 9 of the drawings. The lower ends of said levers 126 extend through openings 116a of said switch actuators as seen in the drawings. The purpose of the trip levers 126 is to insure proper mechanical sequence of operation of the stepper assembly, and maintain exact correspondence of the stepper assembly at all times in relation to the remotely located apparatus being controlled thereby, as will hereinafter appear.

It is to be understood that normally the snap switches 106, 107, 108 and 109 are in an open circuit position and the spring means thereof reacts through their plungers 112 to urge the actuating members 116 in a direction to cause the lugs 118 to engage the periphery of the cam 120. As long as the cam and the trip levers are in the position as seen in Figure 9, which correspond to a zero starting position of the preselector, the respective snap switches 106, 107, 108 and 109 are held in open circuit relation.

The conductor wires connecting the contacts of the respective switches, including main switch 69, the switches 106, 107, 108 and 109, as well as the electromagnets 96 and 97 are for convenience not shown in the drawings, but may be understood to be connected to suitable contacts located in coupler sections of detachably connectible circuit making and breaking devices, indicated generally at 135 and 140, secured to the rear end mounting plate 25. These coupler sections are adapted to be engaged by cooperating sections on the ends of multiple cable connector devices, which in turn complete electrical circuits to the remotely located electric motor indicated at 152, which serves to actuate or move the apparatus to be controlled.

The entire mechanism, rearwardly of the main frame member 14, is enclosed in a cylindrical sleeve 160, dimensioned for a snug telescopic fit over the circular mounting plate 25 at the rear end of the device and at the forward end is fitted over a circular shoulder 14a at the rear side of the frame member 14.

*Operation*

Figure 13:
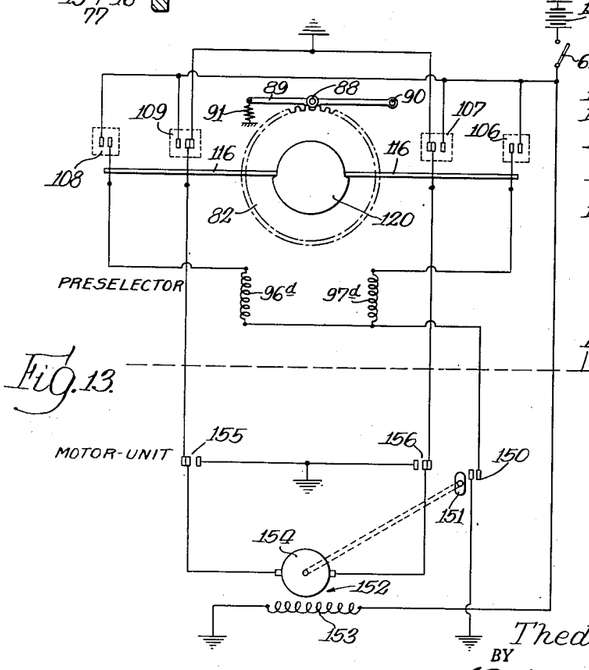
Figure 13 is a diagrammatic representation of an electrical circuit in which my preselector may be employed.

In order that a clear understanding may be had of the operation of my preselector device, reference first will be made to the illustrative wiring diagram as represented in Figure 13 of the drawings.

In the wiring diagram, the portion appearing above the dotted line A represents the circuit including the apparatus embodied within the preselector device, and the portion of the circuit below the dotted line A represents a circuit which may be employed in connection with a remotely located electric motor for controlling the operation or movement of the apparatus, device or mechanism to be adjusted.

In the preselector circuit, the coils of the respective electromagnets 96 and 97 are indicated at 96d and 97d respectively.

In the illustrated circuit for the motor unit, there is disclosed diagrammatically a normally open switch 150 adapted to be intermittently operated by a double lobe cam 151 for supplying interrupted or impulses of current to the electromagnets. It may be understood that the cam 151 is connected through suitable reduction gearing to a shunt wound motor 152, which includes a field 153 and an armature 154. Associated with the motor are a pair of limit switches 155 and 156, connected in opposite branches of the armature part of the motor circuit, which circuit is arranged for effecting operation of the motor in both directions. The source of energy for the circuit may be a conventional power supply line, or may be as shown, in the form of a battery 157.

It may be understood that the purpose of the limit switches 155 and 156, associated with the motor or the speed reducing mechanism, is to insure that the motor does not operate through an excessive range, so that the apparatus to be controlled may be moved through a range only which corresponds to the total range of adjustment of the preselector device, or in other words, a range corresponding to approximately 180° of rotation of the knob assembly in either a forward or backward, or in up and down direction.

It will be noted that one side of the battery 157 is grounded and the other side is connected to the open terminal of the switch 69.

In the operation of the preselector, the knob 57 is first rotated to disengage the latching bar 60 by moving the latter into registration with the opening 61 in the panel 45, and by virtue of the pressure of the spring 63, the knob 57 is urged to its outermost position, as seen in full lines in Figure 1 of the drawings. As result of such movement, the shaft 55 is axially moved under influence of the pressure of the spring of the main switch 69, acting through the plunger 68 against the abutment head 67 at the rearward end of said shaft 55, permitting said main switch 69 to assume a closed position. The electrical circuit by closure of the main switch 69 is only partially completed, and it is to be understood that said switch 69 is here provided as a main switch to break the circuit to the source of power supply.

Figure 8:
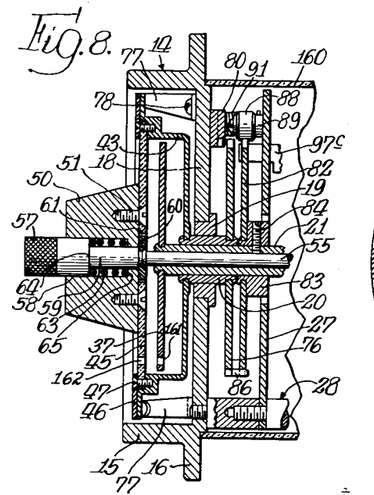
Figure 8 is a fragmentary, sectional view of the forward end of the control device with the parts disposed in position in the process of adjustment of the device to a preselected angular position.

The preselector device embodying the present invention is now in condition to be manipulated. In order to rotate the control knob 50 and the associated parts, it is first necessary to move the knob, together with the associated parts, including the selector gear 76, frame 43, panel 45, and dial 46, in an axial inward direction, as seen in Figure 8 of the drawings, to disengage the gear 76 from the inter-locking lug 80. Such axial movement causes inter-locking engagement between the selector gear 76 and the stepper gear 82, by the driving dog 86 on the gear 76, moving into meshing engagement, between a pair of adjacent teeth of the gear 82, as above described.

The assembly thus moved axially may then be rotated in either direction as a unit by the knob 50, so that the dial 46 will be caused to register with the index 40, on the fixed frame member 14 to indicate a position of adjustment, either up or down, depending on the direction of rotation, or backward or forward, that it is desired to cause the remotely located apparatus or device or mechanism to be controlled, to assume within its predetermined range of movement. Such rotative movement imparts a corresponding amount of rotation to the stepper gear 82.

After this rotatable assembly has been so adjusted angularly, pressure is then relieved on the knob 50 and the assembly is then moved axially outward, under influence of the arcuate springs 77, until it again assumes a position as seen in Figure 1 of the drawings, at which position the gears 76 and 82 are disengaged and the selector gear 76 is again fixedly locked with respect to the frame 14 by engagement with the lug 80.

During the rotative movement of the stepper gear 82 with the assembly as above described, the tubular shaft 55 is likewise rotated by reason of its connection to the stepper gear, and thereby causes the control cam 120 to be rotated to a position corresponding to the angular amount of rotation of said stepper gear incident to such adjustment by the knob 50.

It will be apparent that if the knob 50 is rotated in clockwise direction, the cam 120, by reason of its connection to the stepper gear, will likewise be rotated in the corresponding direction, which in Figure 9 would be counter-clockwise direction. By virtue of such movement, the abutment shoulder 120a at the right-hand side of the cam, as seen in Figure 9, will cam against the camming lug 118 of the adjacent switch actuator 116, and will transmit movement to the plungers 112 of the two switches 106 and 107 to cause them to assume a closed circuit position.

It is to be understood that if the rotative assembly were rotated in the opposite direction, or namely a counter-clockwise direction, the cam 120 would function to cause the other switch actuator 116 to move the switches 108 and 109 to a closed circuit position.

Incident to axial movement of the knob 50 and its associated parts prior to such rotative adjustment, the inner shaft 55 is imparted axial movement, so as to cause its abutment head 67, at the rear end thereof, to simultaneously actuate the main switch 69 to cause it to assume an open circuit position. When pressure is relieved on the knob 50, after the parts have been rotatably adjusted, the assembly is axially moved to normal outward position by springs 77, and the main switch 69 again assumes a closed circuit-making position. If the knob 50 and dial assembly have been adjusted in clockwise direction, the instar that the assembly assumes its outer position of adjustment, the main switch 69 is again in close position, and the two switches 106 and 107 having been previously caused to assume a closed circuit position by the rotation of the cam 120, the stepper mechanism is immediately set in motion and pulsating current is supplied to the electromagnet 97, by the intermittently operated switch 150, causing its corresponding stepper finger to actuate the stepper gear 82 in step-by-step fashion, in a counter-clockwise direction, as viewed from the face of the control, until the stepper gear returns to its zero starting position. When the stepper gear 82 arrives at its starting position, the operated switch actuator 116 is permitted to move inwardly, when disengaged by the adjacent abutment shoulder 120a, by the mechanical sequence device hereinafter described, thus resulting in switches 107 and 108 moving to open circuit position and breaking the motor circuit and causing arresting of the apparatus to be controlled at a position in correspondence with the adjusted position of the knob 50 and its dial assembly.

As the stepper gear 82 returns to zero starting position, the stepper disc 37 moves therewith to position its indicator 38 in registration with the graduated dial and will indicate at any given time the exact position of adjustment of the apparatus being adjusted, and when the stepper gear is at zero starting position, the indicator 38 of the stepper disc is aligned with the fixed index 40. The graduations on the dial plate 46, then in registration with the index 40 visually indicates the amount and direction of movement imparted to the remotely located apparatus to be controlled, or in other words, the exact position of adjustment of the remotely located apparatus, within its permissible range of movement.

As either of the electromagnets is intermittently energized in a pulsating manner, resulting in pulsating movement of the armatures thereof, the corresponding trip lever 126, associated with the extension 128 on the armature being so actuated, is likewise raised up and down within the guide slot 122, and when in raised position, its lower outer edge rides over the extreme end of the cam lug 118 of the adjacent switch operating member 116 and holds the set of dual switches in closed position. These trip levers, by reason of their connection to the armatures of the electromagnets, serve to insure proper mechanical sequence of operation and exact correspondence of movement of the preselector with respect to the remotely located apparatus being controlled, so that at all times, the preselector will indicate the exact position of adjustment of the remotely located apparatus to be controlled, regardless of the number of adjustments made by the preselector.

Figure 3A:
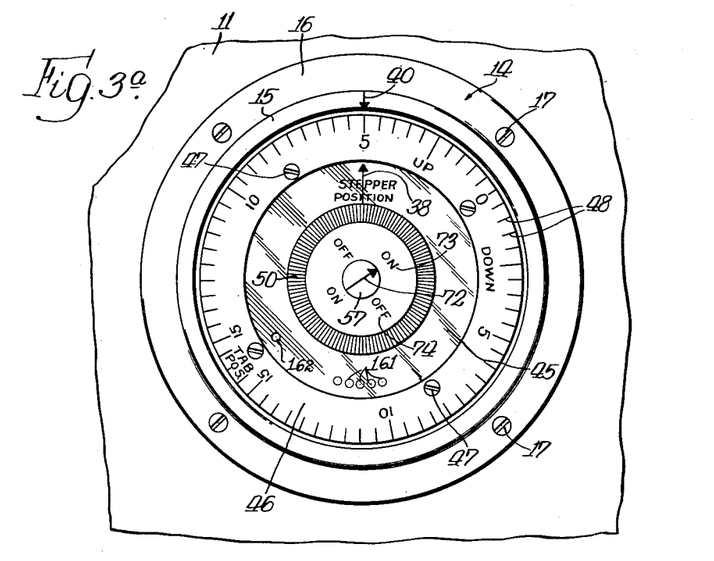

Since the apparatus to be controlled may be adjusted in either direction of its permissible range of movement, it is not essential in order to effect re-adjustment, that the apparatus be brought back to a neutral or zero starting position, as any intermediate permissible amount of movement may be readily made. As for example, if the preselector apparatus is used in connection with controlling the trim tab of an airplane and wherein the trim tab is mounted for pivotal movement, it may be desired to adjust the trim tab in an upward direction, say for example five degrees, as seen in Figure 3a of the drawings. To accomplish this, the main knob 50 and its assembly are first moved axially inwardly, as seen in Figure 8, and then the assembly is rotated clockwise until the graduation 5 is in registration with the index 40 and upon release of the control knob 50, the assembly moves axially outward to the position seen in Figure 1 of the drawings, and the preselector unit operates in step-by-step fashion, which corresponds to the rate of motion imparted by the motor to the remotely located apparatus, for moving said trim tab and causing it to assume a position, in the amount of five degrees, in an upwardly disposed relation to a normal or neutral position of adjustment.

Now if it is desired to move the trim tab downwardly two degrees from such adjusted position, it is then only necessary to readjust the preselector by first axially moving the knob 50 and assembly and turning it counter-clockwise until the graduation 3 registers with the index 40, and the preselector and the trim tab immediately adjust themselves to this exact corresponding position.

Now if it is desired that the trim tab be moved in a downwardly direction, for example six degrees below its normal or neutral position of adjustment, the main operating knob 50 is again pushed inwardly and turned counter-clockwise, with the zero marking of the graduated dial 46 passing beyond the index 40, and continuing until the graduation 6 on the downward side of the dial is registered with the index 40, and as soon as pressure is released from the operating knob 50, the assembly again assumes its outward axial position of adjustment, completing the electrical circuit, so that the preselector is stepped in correspondence with movement of the trim tab until the trim tab acquires the position of six degrees downwardly with respect to its normal position and the stepper gear arrives at its neutral or zero position. In this condition of adjustment, the dial 46 has its graduation "6" on the down side of the dial disposed in registration with the index 40. Therefore, the dial together with the index finger 38 of the stepper disc 37 will at all times indicate the exact position of the trim tab, or other remotely located apparatus to be controlled, and this is true even during the interval that the trim tab is being moved, and the stepper gear as well as the stepper disc are being returned to a neutral or zero starting position.

Now referring to the wiring diagram, it will be apparent, if the preselector is adjusted in clockwise direction, the switches 106 and 107 are first closed, and then subsequent closure of the main switch 69 is effected by the release of pressure on the knob 50 and the assembly of parts, is moved axially outward to the position seen in Figure 1. The electrical circuit is then completed, so that current flows through the two switches 106 and 107, and the current flowing through the switch 106 causes energization of the coil 97d of the electromagnet 97, when the intermittently operated switch 150 is closed, and likewise current flows through the main switch 107, through the normally closed limit switch 156, through one side of the armature 154 of the motor, to the other side, and through the other limit switch 155, and thence through a normally closed portion of the switch 109 to ground. Thus the motor circuit is instantly energized upon the closure of the switches 106, 107 and main switch 69, and by reason of the gear reduction mechanism between the motor 152 and the cam 151 causes the switch 150 to be closed during each half cycle of rotation thereof, or in other words, twice during each complete rotation of the cam. Each time that the switch 150 closes, the coil 97d of the electromagnet 97 is energized, causing the stepper finger 97c to step the stepper gear 82 one tooth in counter-clockwise direction, as viewed from the face of the preselector, and this stepping action continues as long as the motor circuit remains energized, resulting in operating the cam 151. When the stepper gear 82 arrives at the zero or initial starting position, the main control cam 120 then acquires the position seen in Figure 9 of the drawings, at which time pressure is relieved on the cam lug 118, so that the switch operating member 116 at the right side, as viewed in Figure 9, is permitted to move inwardly, subject, however, to control of the adjacent trip lever 126, toward the axis of the instrument, and the spring action of the snap switches 106 and 107 causes said switches to assume an open circuit position, thus breaking the motor circuit and arresting movement of the cam 151 and stepper mechanism.

While not shown, it is to be understood that suitable power takeoff connections are associated with the motor 152 for moving the remotely located apparatus to be controlled, within its permissible range of movement.

If it is desired that the apparatus to be controlled be returned to a zero or starting position or even beyond the zero or starting position, the knob 50 and assembly is again pushed inwardly, and rotated so as to dispose the graduated dial 46 in proper registration with the index 40, corresponding to the desired position of adjustment to be assumed by the remotely located apparatus. as soon as such adjustment is made, the other set of dual switches 108 and 109 are closed by operation of the cam 120, again completing the motor circuit, for reversing the direction of rotation of the motor, as may be clearly noted from the wiring diagram, and the cam 151 operated by the motor intermittently operates the switch 150 and effects intermittent energization of the coil 96d of the relay 96, and thereby causes intermittent or pulsating operation of the stepper finger 96c for actuating the stepper gear 82, in step-by-step fashion in clockwise direction with respect to the face side of the instrument. And again when the stepper gear 82 arrives at the zero or starting position, the cam 120 likewise arrives at its starting position, as indicated in Figure 9, relieving pressure on the left-hand switch actuator 116, and permitting the switches 108 and 109, subject to control of trip lever 126, to assume an open circuit position, causing arresting of the motor and the cam 151, together with the apparatus actuated by the motor, and precluding further intermittent stepping action of the stepper gear.

It will also be noted that the circuit is such that in the event either of the limit switches 155 or 156 are caused to operate, the armature then becomes connected in a shunt circuit, and the circuit functions as a dynamic brake, and results in causing immediate stoppage of rotation of the armature.

While I have herein shown the cam 151 of such form as to effect closing of the switch 150 twice during each revolution thereof, any other suitable form of cam may be employed for effecting closing of the switch a desired number of intervals during each rotation of the cam. It is to be understood that the driving mechanism to be associated with the apparatus to be moved must be so proportioned, that there is exact correspondence of movement with respect to the adjustment of the controlled apparatus with the preselector device.

The mechanical sequence device composed of the trip levers 126 insures maintenance of exact correspondence of position of the apparatus to be controlled and the preselector device. For example, if the apparatus is used in connection with a trim tab, which is to be adjusted say five degrees, in an upward direction, the knob 50 and associated parts are manipulated in clockwise direction to register the number "5" of the graduated dial 46 with the index 40, as seen in Figure 3ª. For purposes of illustration, it is to be assumed that the gear reduction associated with the motor is such that each time a lobe of the cam 151 engages and closes the switch 150, the stepper device is operated, so as to rotate the stepper gear 82 in counter-clockwise direction an amount corresponding to one-half of a degree. Now when the cam 151 engages the switch 150 to provide the last pulsation of current to the electromagnet 97, it will be apparent that when the armature 97a is attracted to its core, and the stepper gear 82 is rotated to its starting position, the conrol cam 120 assumes the position seen in Figure 9, in which position the switches 106 and 107 would normally and instantly move to open circuit position, which would result in breaking the motor circuit, and causing arresting of the motor instantly with the cam 151 holding the switch 150 in closed position. While the stepper assembly would clearly indicate a five degree upward adjustment, it will be apparent that the next time that the preselector is adjusted, that just as soon as the switches 106 and 107 or the switches 108 and 109 are closed, together with the main switch 69, the cam 151 being in position to maintain the switch 150 in closed position, the magnet 97 is instantly stepped prior to movement of the cam 151 by the motor and the adjustment of the trim tab would be out of correspondence with the adjusted position of the preselector. This error obviously would increase each time that the preselector apparatus is adjusted, because the preselector, each time that it is adjusted, would become out of step with the trim tab, by one pulsation, which, as stated by way of illustration, would represent a half degree of misadjustment each time the apparatus is adjusted.

The trip levers 126 preclude this mis-adjustment, because when either of the armatures, depending on the direction of operation of the trim tab, is attracted during the last pulse caused by the closing of the switch 150, the downward movement of the armature raises the corresponding trip lever 126, as seen in Figure 11, so that its outer vertical edge is in engagement with the adjacent cam lug 118 on the adjacent switch actuator 116, and precludes the switch actuator moving to the position seen in Figure 9, until the trip lever again returns to its lowered position, with its shoulder 130 disposed below the adjacent shoulder 120a of the cam 120, as seen in Figure 9. Such adjustment of the trip member 126 occurs when the armature is released, and moves to its outer position, at which time the switch actuator 116 is then permitted to move inward to the position seen in Figure 9, so that the switches 106 and 107 or the switches 108 and 109, as the case may be, are permitted to assume an open circuit position. In other words, the motor is maintained energized, and drives the cam 151 until the trip finger 126 associated with the electromagnet being energized by pulsations of current, arrives at its lowermost position as seen in Figure 9, at which time, the pair of dual switches are caused to assume an open circuit position and break the motor circuit, at the time that the switch 150 is in open position.

The knob 50, and associated parts, are rotatable, in either direction from the zero starting position, through an arc of approximately 180°, and the assembly is precluded from being rotated in excess of this amount by the shoulders 120a of the cam 120, adapted to abut against the top of the cam lug 118 of the switch actuator 116 at the opposite side thereof.

Because the stepper gear and selector gear may become inadvertently misaligned, I provide a series of apertures 161 in the lower portion of the position disc 37, and an aperture 162 in the plate 45, so that a suitable prong may be inserted through the aperture 162 into one of the apertures 161 and shift the disc, together with the stepper gear 82, against the pressure of the action of the detent roller 88, to obtain exact alignment with the selector gear 76, which is rigidly connected to the plate 45 through the dial frame 43 and hub 20.

The term "remote" as used herein and in the claims is intended to indicate that the preselector device embodying the present invention is adapted for controlling apparatus wherein the preselector device is not mounted directly on the movable elements being controlled and the term should not be construed in a limited sense as indicating the location of the control device a substantial distance from the element or elements being controlled.

Although I have herein shown and described one embodiment of my invention, manifestly it is capable of modification and rearrangement of parts without departing from the spirit and scope thereof. While specific mention has been made as to certain uses of my invention, it will also be apparent the preselector device embodying this invention may be used in connection with the controlling of various types of remotely located apparatus, which are adapted to be moved within a predetermined range, and by virtue of which the adjustment of such apparatus to the desired position is effected in a relatively short period of time, after the preselector has been adjusted. The preselector may also be used in connection with certain auxiliary apparatus and have its circuits subject to the control by operation of such other apparatus. I do not, therefore, wish to be understood as limiting this invention to the precise embodiment herein disclosed, except as I may be so limited by the appended claims.

I claim:

1. A preselector for controlling the movement and positioning of remotely located electric power operated apparatus within a predetermined range of movement, comprising a mounting frame; a two direction stepper mechanism mounted on the frame and adapted to be operated by pulsations of electric current; a two direction selective adjustment means on said frame and adapted to interengage with said stepper mechanism and adapted to be moved from a zero starting position, in either direction, to a position corresponding to a position to which said apparatus is to be moved, within its range of movement; means on the frame, rendered operable incident to completion of adjustment movement of said selective adjustment means for completing interconnected electric control circuits for operating said stepper mechanism an amount corresponding to the extent of adjustment of said adjusting means and simultaneously actuating said apparatus to cause the same to assume a position of adjustment, within its range of movement, corresponding with the position of adjustment of said adjusting means, and means on said frame, interconnected with said stepper mechanism and said circuit controlling means for maintaining completion of the circuit to said power operated apparatus in timed relation to the actuation of the stepper mechanism for insuring movement of said apparatus to a position, within its range, in exact correspondence with the position of adjustment of said adjustment means.

2. A preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; cam means under control of said gear and operable, upon completion of adjustment of said adjustment means for effecting closure of a corresponding pair of switches of one said dual set of switch means, to complete two branch electric circuits to a corresponding electromagnet and said power operated apparatus to cause said electromagnet to move said gear in step-by-step manner to its zero starting position; and means to simultaneously cause said apparatus to be moved in exact synchronism with said gear to a preselected position of adjustment.

3. A preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; a main switch connected in circuit with each switch; an axially movable shaft for controlling said switch; abutment means on the knob assembly adapted when said assembly is moved in process of adjustment to cause axial shifting of said shaft to actuate said main switch, said switch assuming a closed position immediately after said knob assembly has assumed an adjusted position; cam means under control of said gear and operable, incident to adjustment of said adjustment means for effecting closure of a corresponding pair of switches of one said dual set of switch means, to complete two branch electric circuits to a corresponding electromagnet and said power operated apparatus to cause said electromagnet to move said gear in step-by-step manner to its zero starting position; and means to simultaneously cause said apparatus to be moved in exact synchronism with said gear to a preselected position of adjustment.

4. A preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspndence to the adjusting movement of said adjustment means; a main switch connected in circuit with each switch; an axially movable shaft for controlling said switch; abutment means on the knob assembly adapted when said assembly is moved in process of adjustment to cause axial shifting of said shaft to open said main switch, said switch assuming a closed position immediately after said knob assembly has assumed an adjusted position; cam means under control of said gear and operable, upon completion of adjustment of said adjustment means for effecting closure of a corresponding pair of switches of one said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment; an internal knob, mounted centrally of said knob assembly, for axial movement therein and adapted to engage said shaft for imparting axial movement thereto for opening said main switch; and locking means for holding said internal knob in such inward position of adjustment, with said main switch open.

5. A preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; cam means under control of said gear and operable, upon completion of adjustment of said adjustment means for effecting closure of a corresponding pair of switches of one said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and sequence mechanism connected to and operable by the armatures of the respective magnets in cooperation with said last mentioned means to control the corresponding sets of switches, whereby energization of one of said magnets selectively by pulsations of electric current causes the stepper gear to be moved to zero starting position, and said sequence mechanism to be positioned, during the last pulse of the operated electromagnet, to maintain the corresponding set of switches in closed position until said armature of the operated magnet returns to deenergized position, whereby to insure maintaining exact correspondence in movement of said apparatus with said preselected adjustment of the adjustment means.

6. A unitary preselector for controlling the movement and positioning of remotely located electric power apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current, and stepper fingers associated with said magnets for operating said gear in step-by-step manner; a dual set of normally open switch means for each electromagnet mounted on the frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means, a main switch connected in circuit with each switch of each set; manually adjustable means, independent of the adjustment means for controlling said main switch; and means movable with said gear to adjusting position for closing the two switches of a corresponding set to complete two branch circuits to a corresponding magnet and the power operated apparatus respectively to cause said magnet to move said gear in step-by-step manner to its zero starting position and simultaneously cause said apparatus to move in synchronism with the gear to the preselected position of adjustment.

7. A unitary preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current, and stepper fingers associated with said magnets for operating said gear in step-by-step manner; a dual set of normally open switch means for each electromagnet mounted on the frame, each of said switch means including a switch in circuit with a corresponding magnet, and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; a main switch connected in circuit with each switch of each set; manually adjustable means, independent of the adjustment means for controlling said main switch; means associated with said manually adjustable means for releasably securing the same in position to maintain said main switch in open circuit position; and means movable with said gear to adjusting position for closing the two switches of a corresponding set to complete two branch circuits to a corresponding magnet and the power operated apparatus respectively to cause said magnet to move said gear in step-by-step manner to its zero starting position and simultaneously cause said apparatus to move in synchronism with the gear to the preselected position of adjustment.

8. A preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electro-magnets adapted to be selectively operated by impulses of electric current and stepper fingers associated with said magnets for operating said gear in step-by-step manner; a dual set of normally open switch means for each electro-magnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means, cam means under control of said gear and operable upon completion of adjustment of said adjustment means for effecting closure of a corresponding pair of switches of one said dual set of switch means to complete two branch electric circuits to a corresponding electro-magnet and said power operated apparatus to cause said electro-magnet to move said gear in step-by-step manner to its zero starting position and simultaneously cause said apparatus to be moved in synchronism with said gear to a preselected position of adjustment; and means on said frame, inter-connected with the stepper mechanism and said last-mentioned means for maintaining said pair of switches in circuit closing position to maintain in timed relation to operation of the stepper mechanism for insuring movement of said apparatus, to a position within its range in exact correspondence with the position of adjustment of said adjustment means.

9. A preselector for controlling the movement and positioning of remotely located electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a snap-action switch in circuit with a corresponding magnet, and a snap-action switch in circuit with the power operated apparatus, a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; switch actuators for each pair of switches pivotally mounted on the frame; cam means operable with said gear to actuate one of said switch actuators to close a corresponding pair of switches to complete branch electric circuits to a corresponding magnet and the power operated apparatus; a main switch, in circuit with each switch of each pair and movable to circuit closing position upon completion of adjustment of said adjustment means whereby to cause said corresponding magnet to move the gear in step-by-step manner to its zero starting position and simultaneously cause said apparatus to be moved to a position of adjustment, within its range, in exact correspondence with the position of adjustment of said adjustment means, said cam means being so formed as to release said operated switch actuator, when the stepper gear arrives at its zero starting position, to permit said pair of switches to assume open circuit position; and means for causing said apparatus to be arrested in exact position of adjustment corresponding to the position of said adjustment means.

THEDORE OBSZARNY.

REFERENCES CITED

The following references are of record in the file of this patent:

UNITED STATES PATENTS

| Number | Name | Date |
| --- | --- | --- |
| 563,304 | Ongley | July 7, 1896 |
| 595,344 | Russell | Dec. 14, 1897 |
| 665,133 | Riggs | Jan. 1, 1901 |
| 999,947 | Barnum | Aug. 8, 1911 |